US010698115B2

(12) United States Patent
Syrjarinne

(10) Patent No.: US 10,698,115 B2
(45) Date of Patent: Jun. 30, 2020

(54) SUPPORTING AN EXTENDED USE OF ASSISTANCE DATA FOR GALILEO

(71) Applicant: HERE Global B.V., Eindhoven (NL)

(72) Inventor: Jari Tapani Syrjarinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 282 days.

(21) Appl. No.: 15/634,000

(22) Filed: Jun. 27, 2017

(65) Prior Publication Data
US 2018/0372877 A1 Dec. 27, 2018

(51) Int. Cl.
G01S 19/05 (2010.01)
G01S 19/21 (2010.01)
G01S 19/25 (2010.01)
G01S 19/27 (2010.01)

(52) U.S. Cl.
CPC .......... G01S 19/05 (2013.01); G01S 19/215 (2013.01); G01S 19/258 (2013.01); G01S 19/27 (2013.01)

(58) Field of Classification Search
None
See application file for complete search history.

(56) References Cited

U.S. PATENT DOCUMENTS

| 8,370,629 B1 | 2/2013 | Ngo et al. |
| 8,948,392 B2 | 2/2015 | Chassagne |
| 9,217,792 B2 | 12/2015 | Wu |
| 9,467,293 B1 | 10/2016 | Brainard |
| 9,470,796 B2 | 10/2016 | Jantz et al. |
| 2003/0171860 A1 | 9/2003 | Fan |
| 2008/0080712 A1 | 4/2008 | Huang |
| 2009/0124267 A1 | 5/2009 | del Castillo |
| 2009/0215467 A1* | 8/2009 | Shim ............. H04W 8/02 455/456.1 |
| 2010/0007554 A1 | 1/2010 | Wang et al. |
| 2011/0296184 A1* | 12/2011 | Tran ............. H04L 9/088 713/170 |
| 2013/0176168 A1 | 7/2013 | Lo et al. |

(Continued)

FOREIGN PATENT DOCUMENTS

DE 112015000695 T5 2/2014
EP 2397868 A1 12/2011
(Continued)

OTHER PUBLICATIONS

Baldini et al.: "Robust GNSS Services for Road Transportation", European Union 2016 (http://publications.jrc.ec.europa.eu/repository/bitstream/JRC104649/robust_gnss_v10_onlinecorrect.pdf).

(Continued)

Primary Examiner — Whitney Moore
(74) Attorney, Agent, or Firm — Lempia Summerfield Katz LLC

(57) ABSTRACT

A system with at least one device obtains assistance data for Galileo for a current time from at least one terrestrial apparatus. The system predicts assistance data for Galileo for a plurality of subsequent time instants based on the obtained assistance data for Galileo and associates for each subsequent time instant a separate message authentication code with the predicted assistance data. The system causes transmission of information comprising at least the predicted assistance data for Galileo and the associated message authentication codes to a satellite signal receiver.

20 Claims, 6 Drawing Sheets

(56) References Cited

U.S. PATENT DOCUMENTS

| | | |
|---|---|---|
| 2013/0251150 A1 | 9/2013 | Chassagne |
| 2014/0327541 A1 | 11/2014 | Ani |
| 2014/0351576 A1 | 11/2014 | Enge et al. |
| 2016/0154106 A1 | 6/2016 | Fernandez-Hernandez |
| 2017/0031027 A1 | 2/2017 | Jantz |
| 2017/0031028 A1 | 2/2017 | Fernandez Hernandez |
| 2017/0188197 A1 | 6/2017 | Finlow-bates |

FOREIGN PATENT DOCUMENTS

| | | |
|---|---|---|
| EP | 2708917 A1 | 3/2014 |
| EP | 2746810 A1 | 6/2014 |
| EP | 2770340 A1 | 8/2014 |
| EP | 2799908 A1 | 11/2014 |
| WO | WO2015164609 A1 | 10/2015 |

OTHER PUBLICATIONS

European GNSS Agency (GSA): "Development, Supply and Testing of a Galileo Open Service Authentication User Terminal (OS-NMA) for the GSA"; Annex I to Invitation to Tender 'Tender Specifications', Ref: GSA/OP/23/16/Annex I, Issue: 1, Date: Jan. 27, 2016 (https://www.gsa.europa.eu/development-supply-and-testing-galileo-open-service-authentication-user-terminal-os-nma-gsa).

Fernández-Hernández et al.; "A Navigation Message Authentication Proposal for the Galileo Open Service", Navigation: Journal of the Institute of Navigation, vol. 63, No. 1, Spring 2016 (http://spcomnav.uab.es/docs/journals/Navigation-FERNANDEZ2016.pdf).

HERE Positioning: Find out where you are, with or without GPS (https://here.com/en/products-services/products/here-positioning) Apr. 24, 2017.

Walker et al.: "Galileo Open Service Authentication: a Complete Service Design and Provision Analysis", Conference Paper Sep. 2015 (http://www.galileocsdemo.eu/wpcontent/uploads/2017/02/2015-ion-osnmawalker-iongnss2015.pdf).

Wesson et al.; University of Texas at Austin: "Practical Cryptographic Civil Gps Signal Authentication" (https://radionavlab.ae.utexas.edu/images/stories/files/papers/nma.pdf), Feb. 2012.

Open Mobile Alliance. "UserPlane Location Protocol." Draft Version 2 (2007): 1-406.

Hein, Guenter, et al. "Authenticating GNSS: proofs against spoofs, Part 2." Inside GNSS 2.5 (2007): 58-63.

Lytvyn, Mykhailo, Albert Kemetinger, and Philipp Berglez. "How can an orbit prediction module speed up the TTFF and help to authenticate the position?." Satellite Navigation Technologies and European Workshop on GNSS Signals and Signal Processing,(NAVITEC), 2012 6th ESA Workshop on. IEEE, 2012.

PCT International Search Report and Written Opinion of the International Searching Authority dated Sep. 27, 2018 for corresponding PCT/EP2018/067018.

PCT International Search Report and Written Opinion of the International Searching Authority dated Aug. 3, 2018 for corresponding PCT/EP2018/067024.

\* cited by examiner

| Information | Benefit |
|---|---|
| Reference Time: Initial Time within 3 s from NTP | Sensitivity Improvement |
| Reference Location: Initial Location from Cell or Wi-Fi | Sensitivity and TTFF improvement |
| GNSS Specific Data: GNSS System Time Differences | Sensitivity and TTFF improvement |
| Almanac: BC Almanac Data specific per GNSS | TTFF improvement |
| Ephemeris Data: BC Ephemeris Data incl. clock model | TTFF improvement |
| Auxiliary Info: GLONASS Frequency allocations | TTFF improvement |
| Real Time Integrity: Real-time satellite signal Status | Reliability improvement |
| Navigation Model: GNSS outages and Future Availability | Reliability improvement |
| Ionospheric Model: BC Ionospheric Model specific per GNSS | Accuracy improvement |
| UTC Model: BC UTC Model specific per GNSS | Conversion from GNSS time(s) to UTC time |
| Security Info: Message authentication codes | Data validation for trusted services |

BC: Broadcast
NTP: Network Time Protocol
TTFF: Time to First Fix
UTC: Coordinated Universal Time

FIG. 5

SUPPORTING AN EXTENDED USE OF ASSISTANCE DATA FOR GALILEO

FIELD OF THE DISCLOSURE

The disclosure relates to the field of positioning and more specifically to supporting an extended use of assistance data for at least one satellite navigation system including Galileo.

BACKGROUND

Global navigation satellite systems (GNSS) are the backbones of positioning and navigation solutions. It has been estimated that the total number of GNSS receivers in the markets has exceeded 4 billion units by the end of 2016. A GNSS receiver (e.g. in the form of a chipset) can be found in every smartphone, smartwatch, new car, high-end drone etc. The volumes are still rapidly growing due to the GNSS integration into Internet of Things (IoT) devices.

It is commonly known that a standalone GNSS receiver does not work satisfactorily in urban areas and it also has certain fundamental bottlenecks in its performance that make it non-ideal e.g. for mass market devices and their use cases. GNSS was originally aimed for outdoor (and continuous signal reception) use only, hence the GNSS signals and the data link from the satellites to the receiver were not designed for weak signal conditions nor to the fastest possible time-to-first-fix. Also, the fact that the satellites are far in the space (at an altitude of 20,000 km) and solar-powered means that no engineering effort will be enough to overcome the physical limitations related to limited transmission power and to the radio propagation loss. Solutions to improve the performance of GNSS receivers need to found on other technologies and radios.

Cellular operators and mobile phone manufactures started to develop GNSS assistance data services roughly 20 years ago, to find a solution for the mentioned GNSS performance gaps. It was discovered that the ranging signal transmitted from the satellites was still strong enough in urban environments to be received with the novel high-sensitivity GNSS receivers, but the navigation data interleaved with the ranging signals become too noisy and erroneous for successful demodulation. (Navigation data contains the satellite orbit and clock parameters among other constellation status info, which are essential for position calculation.) Hence, a solution capable of capturing the satellite navigation data and transmitting that data via an alternative route to the receivers would drastically improve the performance and make GNSS acceptable even for emergency call positioning. As a result, assisted-GPS (later assisted-GNSS, A-GNSS) technology was created, standardized and adopted for commercial use. Today, all the GNSS receivers in the smartphones are A-GNSS receivers i.e. inherently combining GNSS and terrestrial systems into one positioning technology.

The GNSS family consists of several satellite constellations. The first and most widely used is the system developed and operated by the US Air Forces i.e. Navstar GPS, in short: GPS (global positioning system). GPS has been in operational use since 1980's. The Russian counterpart from the Cold War era is GLONASS, which has now been modernized and offering performance equal to GPS. China is currently building up their own global system called Beidou and the EU is ramping up Galileo. In addition to these four global satellite constellations, there exist also regional augmentation systems (satellite based augmentation systems, SBAS) such as the Japanese quasi-zenith satellite system (QZSS) and multi-functional satellite augmentation system (MSAS), the US wide area augmentation system (WAAS), the European geostationary navigation overlay service (EGNOS), the Indian GPS aided geo augmented navigation (GAGAN) system and the Russian GLONASS system for differential correction and monitoring (SDCM).

GNSS constellations offer open service (OS) signals for the civilian and "unauthorized use", and regulated/military signals for the authority and military use, latter of which typically require a specific receiver or encryption keys to use these signals for positioning (even for reception). On the contrary, the structure and format of the OS signals are publicly known, as the interface control documents (ICD) describing the signals and data transmitted by the satellites are freely available. Also, the OS GNSS receivers are commercially available as modules, development kits etc. so it is relatively easy to get access to the GNSS signals and data, even to replicate the signals with perfect receiver compatibility. This "easiness" and openness has led to the development of numerous malicious devices which can be used to "spoof" the GNSS receivers in various ways: either to make them report false position and/or time, or even totally jam/block the performance. None of the existing GNSS systems have any means to authenticate the signals or data the satellites transmit, and hence efficiently avoid spoofing. The lack of signal/service authentication is a very serious risk for the location based services that use GNSS to validate the location of a device or a user e.g. for charging/transactions (road tolls, parking etc.). Especially, for the smartphone use cases this has been seen as one of the major problems.

SUMMARY OF SOME EMBODIMENTS OF THE INVENTION

An example embodiment of a method comprises obtaining assistance data for Galileo for a current time from at least one terrestrial apparatus. The method further comprises predicting assistance data for Galileo for a plurality of subsequent time instants based on the obtained assistance data for Galileo and associating for each subsequent time instant a separate message authentication code with the predicted assistance data. The method further comprises causing transmission of information comprising at least the predicted assistance data for Galileo and the associated message authentication codes to a satellite signal receiver. The method may be performed by at least one device.

An example embodiment of a first system comprises means for causing performance of the actions of any embodiment of the presented method. The means may be distributed to one or more devices.

The means of the system may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second system comprises at least one processor and at least one memory including computer program code, the at least one memory and the computer program code configured to, with the at least one processor, cause at least one device at least to perform the actions of any embodiment of the presented method. The at least one processor and/or the at least one memory may belong to a single device, like a server, or be distributed to several devices.

Any of the described systems may comprise only the indicated components or one or more additional components, like a data interface. Any of the described systems may be a device, be a part of a device or an assembly of a plurality of devices.

Moreover an example embodiment of a non-transitory computer readable storage medium, in which computer program code is stored, is presented. In each case, the computer program code causes at least one device to perform the actions of any embodiment of the presented method when executed by at least one processor.

In either case, the computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer or like an integrated or exchangeable memory card, or it may be intended for distribution of the program code, like an optical disc or memory stick or memory card.

It is to be understood that any embodiment of the computer program code by itself is considered an example embodiment of the invention as well. The computer program code could also be distributed to several computer readable storage mediums.

In certain embodiments, any of the presented methods is an information providing method, and any of the presented first systems is an information providing system. In certain embodiments, the means of the presented first system are processing means.

In certain embodiments, any of the presented methods is a method for supporting an extended use of assistance data for Galileo. In certain embodiments, any of the presented systems is a system for supporting an extended use of assistance data for Galileo.

It is to be understood that any feature presented for a particular example embodiment may also be used in combination with any other described example embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 5 is a table illustrating example information elements in an example A-GNSS response in the system of FIG. 3.

DETAILED DESCRIPTION OF THE FIGURES

Figure 1:
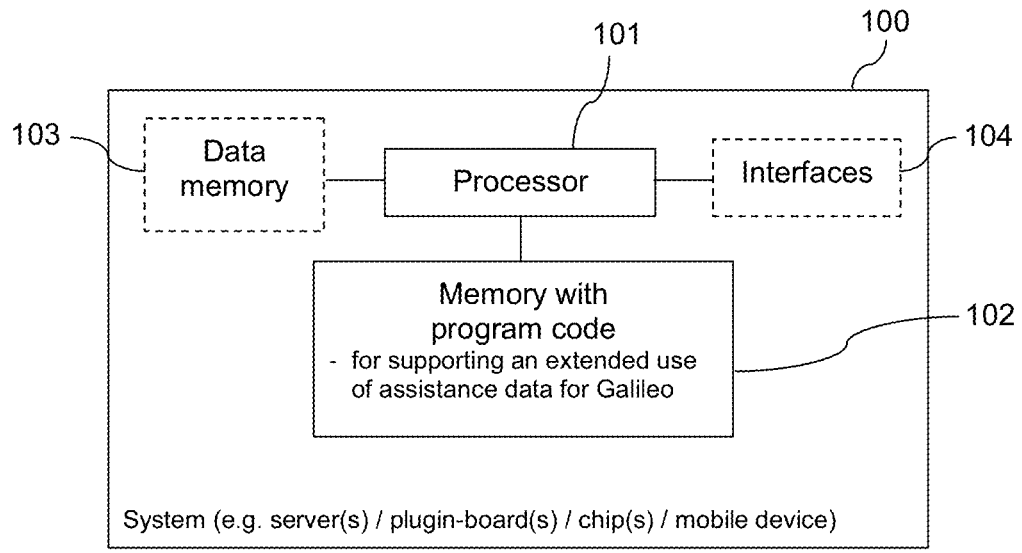
FIG. 1 is a schematic block diagram of a first example embodiment of a system.

FIG. 1 is a schematic block diagram of an example embodiment of a system 100. System 100 comprises at least one processor 101 and, linked to the at least one processor 101, at least one memory 102. The at least one memory 102 stores computer program code for supporting an extended use of assistance data for Galileo. The computer program code may be example computer program code according to the invention, and the at least one memory 102 may be an example computer readable medium. The at least one processor 101 is configured to execute computer program code stored in the at least one memory 102 in order to cause at least one device to perform desired actions.

System 100 may be a device, like a mobile device or a computer/server providing a service to various mobile devices, or it may be a combination of devices, like computers/servers in the Cloud. System 100 may equally be a module, like a chip, circuitry on a chip or a plug-in board, for a device. Processor 101 may be linked to various other, optional components of system 100, for instance to a data memory 103 and/or to data interfaces 104.

An example operation of system 100 will now be described with reference to the flow chart of FIG. 2. The operation is an example embodiment of a method. The at least one processor 101 and the program code stored in the at least one memory 102 cause at least one device to perform the operation when program code is retrieved from the at least one memory 102 and executed by the at least one processor 101. It is to be understood that the at least one processor 101 may comprise or have access to at least one working memory for this purpose, for example in the form of a random access memory (not shown). The at least one device that is caused to perform the operation may be or belong to system 100, or comprise system 100.

The at least one device obtains assistance data for Galileo for a current time from at least one terrestrial apparatus. (action 201) Assistance data for Galileo may be any data that is suited to support the use of Galileo satellite signals.

The at least one device predicts assistance data for Galileo for a plurality of subsequent time instants based on the obtained assistance data for Galileo and associates for each subsequent time instant a separate message authentication code with the predicted assistance data. (action 202) While different message authentication codes are provided for different time instants, the same message authentication code or different message authentication codes may be provided for assistance data relating to one, several or all considered Galileo satellites for a particular time instant.

The at least one device causes transmission of information comprising at least the predicted assistance data for Galileo and the associated message authentication codes to a satellite signal receiver. (action 203) The satellite signal receiver may be configured to receive and process signals from Galileo satellites. Optionally, it may be configured to receive and process in addition satellite signals of any other satellite navigation system. The satellite signal receiver may reside for instance in a mobile device that needs to determine its own position. Such a mobile device may but does not have to coincide with the at least one device performing actions 201 to 203. If it coincides with the at least one device performing actions 201 to 203, the transmission in action 203 is a device internal transmission between at least one component of the device predicting the assistance data and the satellite signal receiver of the device.

The European Galileo system is the youngest member in the GNSS family. The ICD specification and hence the signals/data have not yet been completely defined leaving an opportunity to introduce "add-on features" to the Galileo OS, even to the existing satellites in the constellation.

The European GNSS Agency (GSA) introduced in 2016 a plan to add a method for Navigation Message Authentication (NMA) to the Galileo OS signals aka OS-NMA. The OS-NMA may be taken into testing use in late 2018/early 2019 leading to a full operational implementation within few coming years. The exact details of the Galileo OS-NMA may be introduced in 2018 in an updated version of Galileo OS ICD. Still, the main principles of the coming OS-NMA feature may include:

OS-NMA will authenticate only the Navigation Data transmitted by the satellites, not the ranging signal.
OS-NMA will be included in all the satellites.
OS-NMA will be backwards compatible using some of the "reserved bits" in the current Navigation Data specification.
OS-NMA will use GNSS system time as one of the inputs to create a message authentication codes (MAC).
Receivers will need at least a public key to decode and validate the authentication codes included in the Navigation Data. If the message authentication code (MAC) created by a receiver (via current time) matches with the code sent by the satellite at the given time, the navigation data is accepted by the receiver.

The present embodiments are based on the consideration that A-GNSS services may be able to deliver assistance data for the future. It is, for instance, possible and known to predict the satellite orbit and clock data for several days, even weeks to the future. However, Galileo OS-NMA is designed and implemented to authenticate only the current navigation data in the satellite broadcast. Even if OS-NMA was adapted to the A-GNSS services, it would lack a way to authenticate future assistance data elements.

Certain embodiments therefore provide that Galileo message authentication codes are provided as well for predicted assistance data. The predicted assistance data is then provided to a satellite signal receiver along with associated message authentication codes. While the mechanism for the code creation has not yet been published by the GSA, it is to be understood that the generation and verification of Galileo message authentication codes for the approach may be implemented for instance in compliance with any future standard relating to Galileo OS-NMA. Alternatively, it may be based on a proprietary approach.

Certain embodiments may have the effect that a satellite signal receiver is able to download all the needed Galileo assistance data for hours, days or even weeks in advance, with the opportunity to authenticate the assistance data for each time instant. If the assistance data is predicted in the device comprising the satellite signal receiver, the prediction could alternatively be performed in-time, or whenever suitable. Also in this case, the satellite signal receiver has the opportunity to authenticate received assistance data for each time instant. Assistance data enables improvements to sensitivity and/or time-to-first-fix at a satellite signal receiver, in particular in weak satellite signal conditions. Predicted assistance data enables such improvements without any data connection to any external server and thus in a fully offline mode. Associating message authentication codes with predicted assistance data may enables the satellite signal receiver to provide trusted positioning services even in fully offline mode and to process predicted assistance data in the same manner as original assistance data, including an authentication of the predicted assistance data. There are several use cases that may benefit from reliable predicted assistance data. IoT devices that are not constantly connected to an A-GNSS network due to power saving or accessibility issues, for instance, may still constantly need almost immediate and trusted positioning performance.

Figure 2:
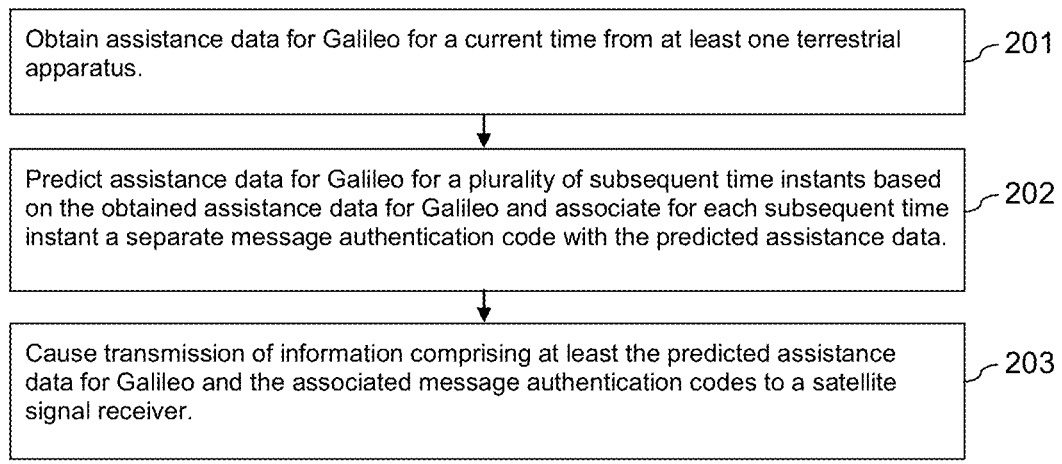
FIG. 2 is a flow chart illustrating a first example embodiment of a method.

System 100 illustrated in FIG. 1 and the method illustrated in FIG. 2 may be implemented and refined in various ways.

In an example embodiment, each message authentication code may be at least a function of time (e.g. Galileo system time GST) and/or of a key varying over time, and optionally in addition of at least one satellite identifier. Using time information may provide a protection against replay-attacks. While the code creation for Galileo OS-NMA is planned to be based on keys, the key management policy has not yet been published by the GSA. It is to be understood that the generation and use of keys may be implemented for instance in compliance with any future standard relating to Galileo OS-NMA.

In an example embodiment the message authentication codes associated with assistance data for Galileo for each subsequent time instant are obtained by the at least one device predicting the assistance data in a list of future message authentication codes from an entity of a trusted source. This embodiment may have the effect that the at least one device predicting the assistance data does not require processing capacity for generating the message authentication codes that are associated with the predicted assistance data. In an alternative embodiment, the message authentication codes associated with assistance data for Galileo for each subsequent time instant are generated by the at least one device predicting the assistance data based on keys from a list of keys usable for generating future message authentication codes and obtained from an entity of a trusted source. This alternative embodiment may have the effect that less bandwidth is needed between the trusted source and the at least one device predicting the assistance data. The trusted source may be for instance Galileo authorities (e.g. GSA), and the entity of the trusted in both embodiments may be for instance an entity controlling/generating message authentication codes.

In the case that keys used for generating the message authentication codes constitute a chain of keys that are derived from a seed key (e.g. a single seed key or a seed key for each satellite), it would also be possible in a further alternative to provide the seed key(s) once to the at least one device predicting the assistance data. This would enable the at least one device to generate any future message authentication code without further input. However, the seed keys are assumed to be tightly controlled by the Galileo authorities due to the high security risks related to a possible leak of the seed keys; therefore this option is not considered further.

The at least one device may receive future message authentication codes and/or future keys continuously and separately for each possible future time instant or in the form of a respective list. In some embodiments, such a list may be received automatically on a regular basis. In some other embodiments, the at least one device may specify a starting time and an end time in a request and receive all message authentication codes and/or all keys for this period from the trusted source in response to the request.

In an example embodiment, however, the at least one device requests a trusted source to provide a list of message authentication codes for specific future time instants; and/or a list of keys enabling a generation of message authentication codes for specific future time instants. This may have the effect that the number of codes and/or keys that are transmitted can be reduced. For instance, if the message authentication codes will be generated at 10 second intervals for transmission by the Galileo satellites, the number of codes and/or keys would become quite large for e.g. a two-week period. The specific future time instants may be defined in this request in any desired manner. For example, the at least one device may indicate exact instants for which codes and/or keys are desired; or the at least one device may indicate a starting time, an end time and an interval or repetition rate within this period at which codes and/or keys are desired, e.g. exact one- or two-hour intervals. The interval may also be predetermined. This may have the effect that the amount of provided codes and/or keys is reduced and that the security risks are minimized, if future codes are accidentally or maliciously leaked.

In an example embodiment, the at least one device predicting the assistance data may receive a request for assistance data for Galileo for future time instants from the satellite signal receiver. Causing transmission of the information comprising the predicted assistance data for Galileo and the associated message authentication codes to the satellite signal receiver may then comprise providing the information in a response to the request. This may have the effect that data is only provided to satellite signal receivers when needed.

In an example embodiment, the request of the satellite signal receiver comprises an indication of a time period for the future time instants; or an indication of a time period for the future time instants and an indication of a time interval for the future time instants; or an indication of future time instants. This may have the effect that even if the at least one device predicting assistance data obtains a complete set of future message authentication codes and/or keys, only selected ones may be provided to the satellite signal receiver. This may have the effect that the at least one device may adapt the transmission of predicted assistance data to the individual requirements of different satellite signal receivers and/or use cases.

In an example embodiment, the at least one device furthermore obtains assistance data for at least one further satellite navigation system from at least one terrestrial apparatus. In this case, the at least one device may predict in addition assistance data for the plurality of subsequent time instants based on the obtained assistance data for the at least one further satellite navigation system. The at least one device may then cause transmission of the predicted assistance data for the at least one further satellite navigation system for a respective time instant in an interrelated manner along with the predicted assistance data for Galileo and the associated message authentication code for the same time instant to the satellite signal receiver. In this way, predicted assistance data for other satellite navigation systems may be authenticated implicitly for each time instant when the corresponding predicted assistance data for Galileo for the same time instant is authenticated by the satellite signal receiver. The at least one further satellite navigation system may comprise for instance GPS and/or GLONASS and/or Beidou and/or at least one satellite based augmentation system. The at least one satellite based augmentation system may comprise for instance QZSS, WAAS, EGNOS, MSAS, GAGAN and/or SDCM. It is to be understood that any combination of these systems may be supported and that any other or future satellite navigation systems may be supported alternatively or in addition. Authenticated assistance data for Galileo and for at least one further satellite navigation system may be used by the satellite signal receiver for position and/or velocity and/or time computations. The computations by the satellite signal receiver may become the more reliable, if assistance data for more satellite navigation systems is used, in particular if all of the assistance data may be authenticated.

In an example embodiment, the at least one device is a device comprising the satellite signal receiver. In this case, the predicted assistance data for each time instant may be transmitted to the satellite signal receiver in device-internal separate messages close to the respectively concerned instant of time.

In an example embodiment, the at least one device comprises a server that is external to a device comprising the satellite signal receiver and that is configured to provide assistance data to a plurality of satellite signal receivers. In this case, the predicted assistance data for a certain period of time and the associated message authentication codes may be transmitted to a respective satellite signal receiver in a single message or basically simultaneously in subsequent messages.

In an example embodiment, the at least one terrestrial apparatus comprises at least one satellite signal receiver of a monitoring network collecting data transmitted by satellites of at least one satellite navigation system, the at least one satellite navigation system comprising Galileo. Such a receiver of a monitoring network may extract navigation data from received signals of Galileo satellites and optionally of satellites of any other satellite navigation system, and provide the navigation data as raw assistance data. Alternatively or in addition, the at least one terrestrial apparatus comprises at least one entity of a trusted source. Such a trusted source may be configured to generate navigation data for transmission by satellites including at least Galileo satellites, and provide the navigation in addition entirely or in part as assistance data. Further alternatively, the at least one terrestrial apparatus comprises at least one server providing an A-GNSS service at least for Galileo and optionally for any other satellite navigation system. This last alternative may be used for instance, in case the device predicting assistance data comprises the satellite signal receiver to which the predicted assistance data is transmitted. It is to be understood that the expression satellite navigation system may comprise satellite based augmentation systems as well. Accordingly, the expression navigation data is to be understood in a broad sense. With some satellite navigation systems it may refer to augmentation data for other systems.

Figure 3:
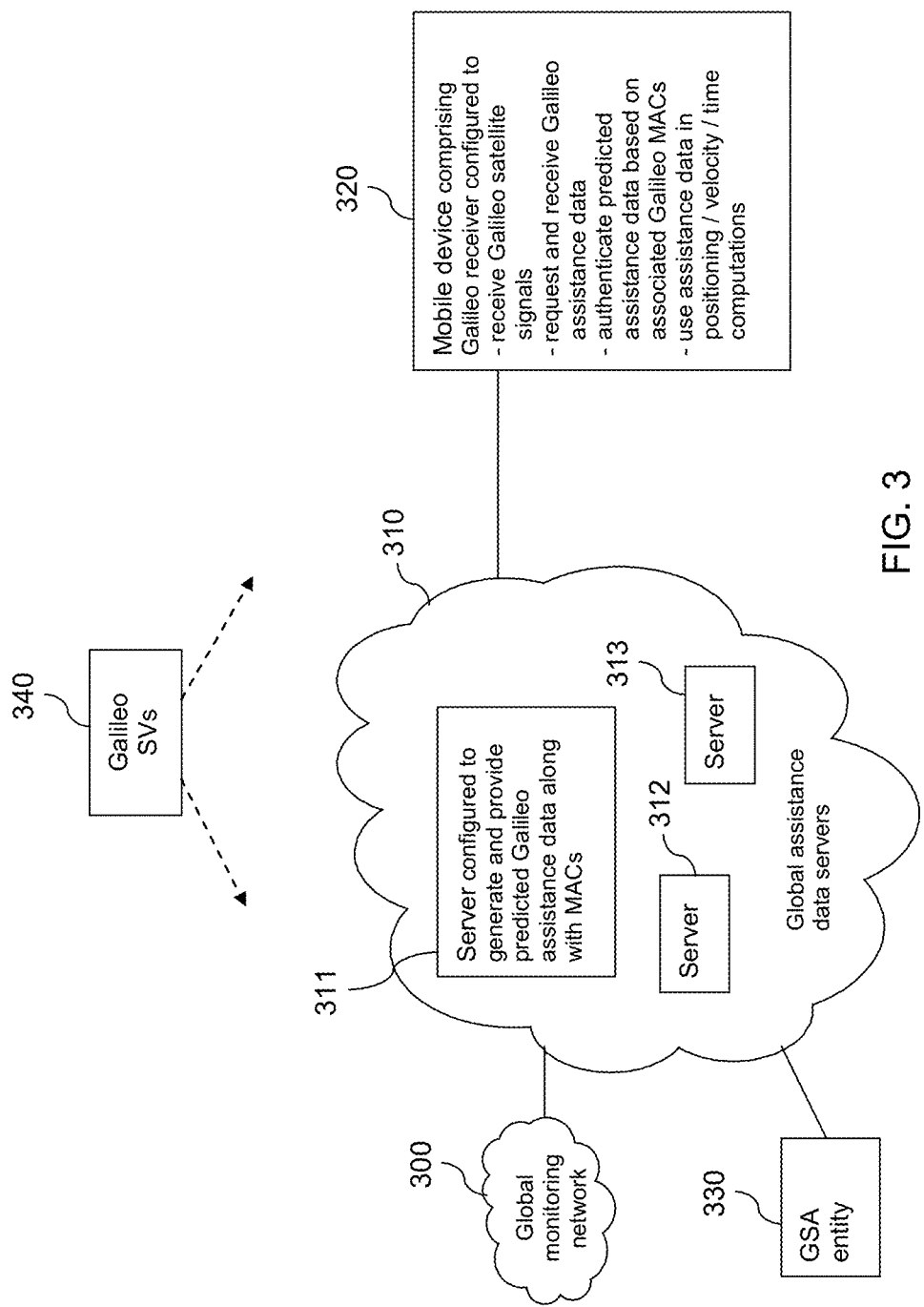
FIG. 3 is a schematic block diagram of a second example embodiment of a system.

FIG. 3 is a schematic block diagram of an example embodiment of a more comprehensive system supporting an extended use of assistance data for Galileo.

The system comprises a global monitoring network 300, global assistance data servers 310, a mobile device 320, and a GSA entity 330. Galileo satellites (or space vehicles SV) 340 broadcast satellite signals, which include navigation data.

The global monitoring network 300 comprises monitoring receivers that are configured to receive Galileo satellite signals from respectively visible satellites 340. The monitoring receivers are configured to extract and forward navigation data and associated data from the signals. They may be distributed across the world.

The global assistance data servers 310 comprise a plurality of servers 311, 312, 313, which are distributed across the world as well. Each of the servers is configured to receive data collected by the global monitoring network 300, to predict Galileo assistance data and to associate message authentication codes with the predicted assistance data. Any of servers 311-313 by themselves or in combination may correspond to system 100 of FIG. 1 and include corresponding components. In this case, interfaces 104 may enable a data communication with the global monitoring network 300, GSA entity 330 and mobile devices 320, for instance via the Internet; and data memory 103 may enable storage of any data that is used for assembling assistance data. It is to be understood that the functions of the global assistance data servers 310 may also be performed in the cloud in a distributed manner.

The global monitoring network 300 is linked to the global assistance data servers 310. The connections are safe and secured by the use of a virtual private network (VPN) and encryption.

GSA entity 330 may be configured to generate MACs for respective instances in time and the keys used for generating the MACs. All MACs and/or the keys may be generated well in advance of the time for which they are valid, for instance some hours or weeks in advance. GSA entity 330 is linked to the global assistance data servers 310 via a safe connection as well.

Mobile device 320 may be any device that is configured to move around and that is expected to be able to determine its own position. It may be for instance a smartphone, a smart watch, a tablet PC, an IoT device or any other mobile device, including industrially used devices. Mobile device 320 is configured to access the Internet for communicating with the global assistance data servers 310. Mobile device 320 comprises a Galileo receiver. With the Galileo receiver, mobile device 520 is configured to receive signals from Galileo satellites 340. A-GNSS service is an integral part of the Galileo receiver. It is configured to accept navigation data (or corresponding assistance data) and MACs from other sources than direct satellite broadcasts, namely from an A-GNSS service, as well. This may be achieved by a minor software/firmware modification. Mobile device 320 is configured to request, receive and process assistance data.

Figure 4:
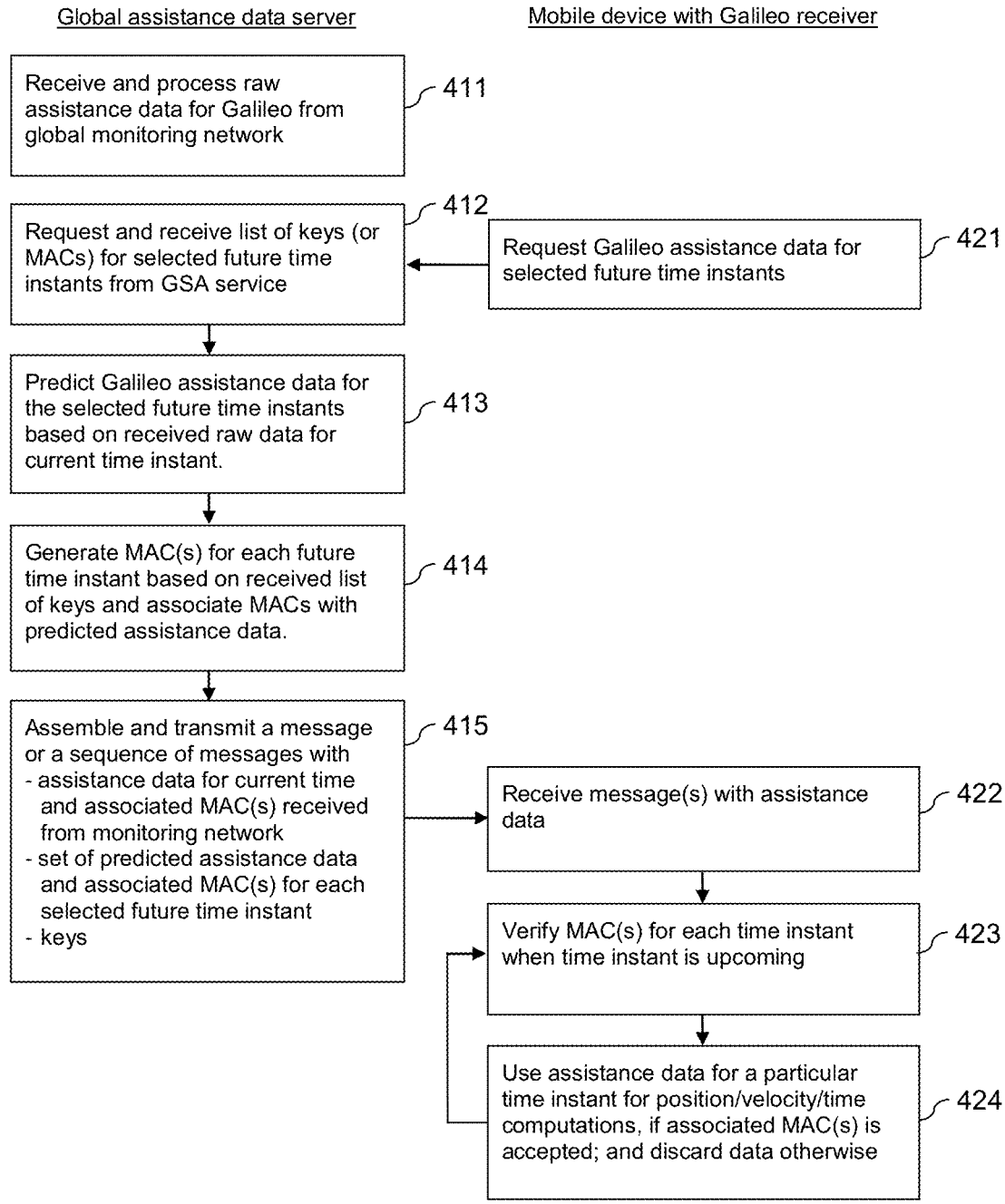
FIG. 4 is a flow chart illustrating an example embodiment of operations in the system of FIG. 3.

FIG. 4 is a flow chart illustrating example operations in the system of FIG. 3. Server 311 is caused to perform the actions presented on the left hand side. Mobile device 320 is caused to perform the actions presented on the right hand side.

Monitoring receivers of the global monitoring network 300 receive signals from Galileo satellites 340. The monitoring receivers extract navigation data and associated data. The harvested navigation data contains real-time data for all visible Galileo satellites 340. Monitoring receivers of the global monitoring network 300 may receive signals from satellites of other satellite navigation systems as well, which is not considered further for this embodiment.

For the present embodiment, Galileo is assumed to have implemented a mechanism for navigation message authentication. Data transmitted by Galileo satellites 340 therefore includes digital signatures, MACs and keys as associated data. The monitoring receivers may store a public key corresponding to a private key that has been used for encoding and signing at least a part of the received data. The monitoring receivers may decode the encoded data, including a MAC and verify its source using the public key. Furthermore, each Galileo MAC associated with received Galileo navigation data may be verified by the monitoring receivers in order to authenticate the associated navigation data. A received MAC may be verified for instance by computing a MAC based on a key that is valid specifically for the time instant for which the navigation data is indicated to be valid and an identifier of the Galileo satellite, using some implemented function; and by comparing the computed MAC with the received MAC. The availability and verification of the employed key may comply with any Galileo standardization that defines the use of MACs for Galileo. In some embodiments, the key for a certain time instant may be received in a subsequent message from a Galileo satellite 340 and be verified based on a reliable root key or a preceding key before it is used for computing the MAC.

One option has been described by Fernández-Hernández, Rijmen, Seco-Granados, Simon, Rodríguez and Calle in "A Navigation Message Authentication Proposal for the Galileo Open Service" in Navigation: Journal of the Institute of Navigation, Vol. 63, No. 1, Spring 2016, pages 85-102. It makes use of a Time Efficient Stream Loss-tolerant Authentication (TESLA) protocol. TESLA is based on the transmission of a MAC to authenticate the plaintext message and the delayed transmission of the key used to compute the MAC. This key belongs to a chain generated through a one-way function F. The chain starts with a random seed key, which is secret, and ends with a root key that is public and certified as authentic. Navigation message authentication through TESLA could be performed in the following way: A receiver receives the navigation data and the MAC. The receiver later receives a key from which the MAC can be generated. The receiver authenticates the key with a previous key from the chain that is considered authentic, or the root key, by performing function F the required number of times. The receiver re-generates the MAC with the key and the data, which should coincide with the previously received MAC. For further details and suggested variations reference is made to the document.

Global monitoring network 300 provides the harvested data as raw assistance data to the global assistance data servers 310 on a regular basis, for instance every 10 seconds, using encryption and VPN. The data may be provided in the encrypted and digitally signed form as received by the global monitoring network 300, along with any digital signatures, and along with MACs and keys for Galileo.

Server 311 receives and decrypts the raw assistance data. (action 411)

When mobile device 320 needs to determine position and/or velocity and/or time (PVT) independently of a regular data connection and thus in an offline mode, it generates and transmits a request for Galileo assistance data to server 311. The request may indicate selected future time instants. (action 421) The future time instants may be indicated for instance by a start time, an end time and a time interval between the desired future time instants for which the assistance data is to be provided. Alternatively, the time span and intervals may be predetermined in the system or defined in configuration data stored in server 311 for mobile device 320. The time period for which future assistance data is requested may cover e.g. one day or any other length. The requested time interval may be for instance five minutes or any other length. The chosen time period and time intervals may depend for instance on the respective use case.

When receiving a request for future assistance from a mobile device, server 311 requests and receives a list of keys for the selected future time instants from GSA entity 330. (action 412)

GSA entity 330 may generally be configured to generate Galileo navigation data and MACs for Galileo navigation data and to forward the navigation data, the MACs and associated keys used for generating the MACs to Galileo satellites 340 for broadcast. A key may be generated based on a secret seed key as a function of a respective GST based time instant for which the Galileo navigation data is valid. A MAC for navigation data that is valid for a certain time instant, in turn, may be generated as a function of the key for this time instant and optionally e.g. as a function of a satellite identifier or a set of satellite identifiers. A separate MAC may be generated for each Galileo satellite taking account of the satellite identifier; or a common MAC may be generated for all Galileo satellites or for a subset of Galileo satellites. The implementation may depend on the eventually implemented standard. It will be assumed for simplicity in the following that a separate MAC is provided for each satellite and each time instant.

Server 311 and the other servers 312, 313 of network 310 may have a special arrangement with GSA entity 330 to provide a special GSA service. In the scope of this service, GSA entity 330 may generate a list of future keys suited to generate future MACs in advance and to provide them in a list to server 311. Optionally, GSA entity 330 could generate in addition the corresponding future MACs and provide them to server 311 in a list. The keys (and MACs) included in the list may be selected based on the selected future time instants indicated in the request from server 311.

Server 311 predicts Galileo assistance data for the future time instants selected by mobile device 320 based on the raw assistance data received from the global monitoring network 300 for the current time. (action 413) Assistance data may be provided for all Galileo satellites, but it would also be possible to select a subset of all Galileo satellites.

In addition, server 311 generates at least one MAC for each of the selected future time instants based on at least one key for this time instant in the received list of keys and based e.g. on at least one satellite identifier of at least one satellite for which the assistance data is predicted. Optionally, there may be more than one MAC per time instant, in case there are to be separate MACs for different satellites. Server 311 associates the generated MACs for future time instants with the assistance data predicted for corresponding future time instants. (action 414) Obviously, if server 311 receives a list of MACs for future time instants as well, it may simply select the suitable at least one MAC and associate it with the assistance data predicated for the respective future time instant.

Server 311 assembles a message and transmits the message to mobile device 320. (action 415) The message may be made available e.g. via a secure proprietary protocol or via a secure REST API (Representational State Transfer Application Programming Interface).

The message comprises assistance data for a current time and associated MAC(s) as received from the monitoring network 300, if the current time lies within the period for which assistance data is requested by mobile device 320. In addition, it comprises a set of predicted assistance data and associated MAC(s) for each selected future time instant. Further in addition, it comprises the keys that are required for generating the MAC(s).

It is to be understood that instead of a single message, a sequence of messages may be used, e.g. one for each time instant. In this case, all messages are transmitted subsequently within an interval that is essentially shorter than the time period for which the assistance data is provided, for instance within one minute for a time period of one day.

FIG. 5 is a table illustrating information elements, along with description and benefits, that may be repeated for each satellite and each time instant in the response. For each set of information elements, one more information element may be added into the A-GNSS response for a message authentication code, as indicated in the last row of the table.

Mobile device 320 receives the message with the assistance data. (action 422) The assistance data and the associated MACs as well the keys may be stored in a memory until needed.

When one of the future time instants becomes a current time, the predicted assistance data for this time instant is retrieved from memory along with the associated MAC(s). Mobile device 320 verifies the MAC(s) using the stored keys. (action 423)

If the MAC(s) for a certain time instant is accepted, mobile device 320 uses the assistance data for this time instant in combination with measurements on received Galileo satellite signals for position/velocity and/or time computations. Otherwise, the assistance data is discarded. (action 424) Thus, mobile device 320 does not have to differentiate between the processing of predicted assistance data and the processing of original assistance data. This may simplify the implementation and also make the use of assistance data more secure, since no other sources may cause mobile device 320 to process fake assistance data that is not accompanied by at least one MAC.

Figure 6:
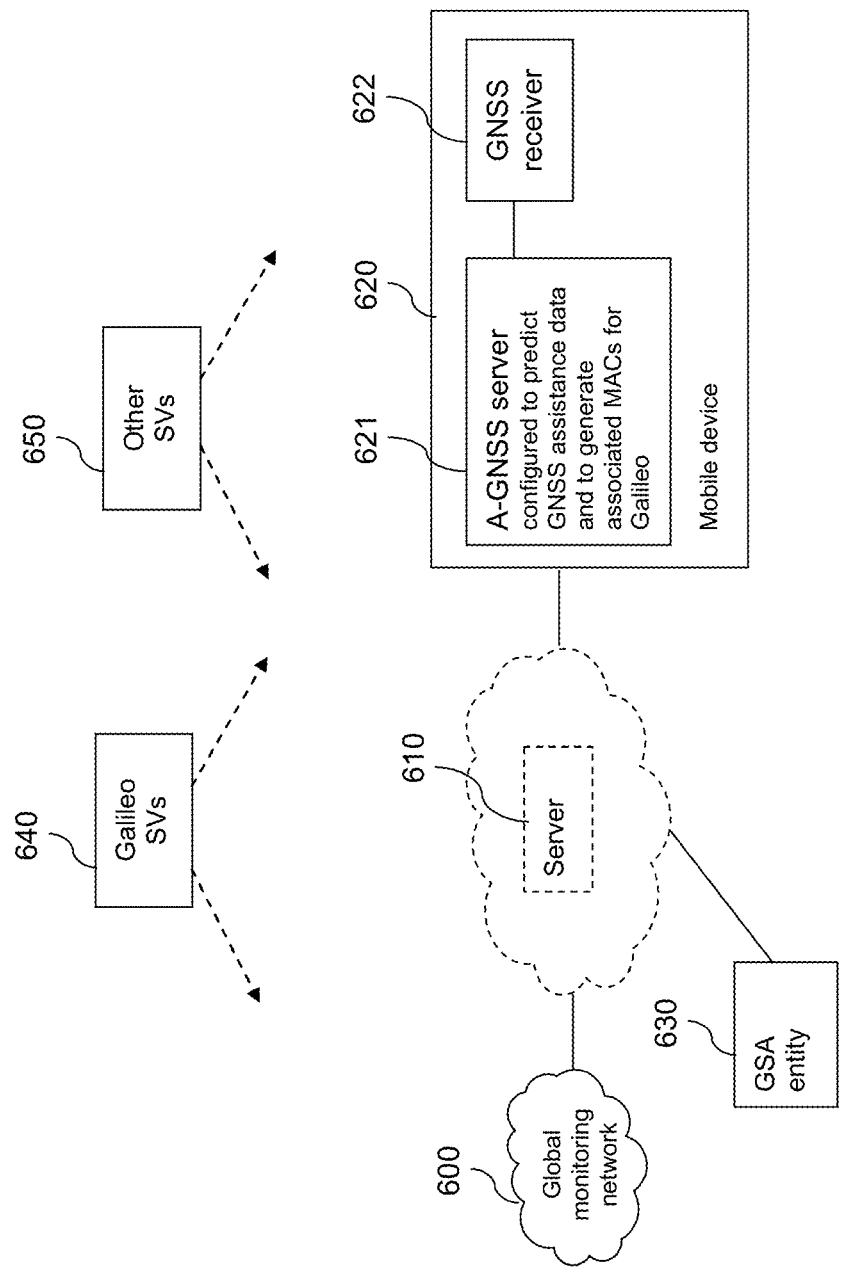
FIG. 6 is a schematic block diagram of a third example embodiment of a system.

FIG. 6 is a schematic block diagram of another example embodiment of a comprehensive system supporting an extended use of GNSS assistance data, and illustrates some possible variations compared to the system of FIG. 3.

The system comprises again a global monitoring network 600, global assistance data servers 610, a mobile device 620, and a GSA entity 630. GNSS satellites 640, 650 broadcast satellite signals, which include navigation data. The GNSS satellites include Galileo satellites 640 as well as satellites 650 of at least one further satellite navigation system, including for instance GPS, GLONASS, Beidou, QZSS and/or one or more other SBAS.

The global monitoring network 600 comprises monitoring receivers that are configured to receive satellite signals from respectively visible GNSS satellites 640, 650. The monitoring receivers are configured to extract and forward navigation data and associated data from the signals. They may be distributed across the world.

The global assistance data servers 610 are distributed across the world as well. Each of the servers is configured to receive data collected by the global monitoring network 600, and to assemble and provide information including GNSS assistance data and optionally further sensitive data upon request of mobile devices 620. It is to be understood that the functions of the global assistance data servers 610 may also be performed in the cloud in a distributed manner. The global monitoring network 600 is linked to the global assistance data servers 610 by means of safe connections.

GSA entity 630 may be configured to generate MACs for current and future time instants and the keys used for generating current and future MACs. It may optionally be linked to the global assistance data servers 610 via a safe connection as well.

Mobile device 620 may be any device that is configured to move around and that is expected to be able to determine its own position. It may be again for instance a smartphone, a smart watch, a tablet PC, an IoT device or any other mobile device, including industrially used devices.

Mobile device 620 comprises an integrated A-GNSS server 621 and a GNSS receiver (or chipset) 622. A-GNSS server 621 is configured to predict GNSS assistance data based on received assistance data. GNSS receiver 622 is configured to receive signals from Galileo satellites 640 and other GNSS satellites 650. A-GNSS service is an integral part of GNSS receiver 622. A-GNSS server 621 may be for instance an embodiment of system 100 of FIG. 1 and include corresponding components. In this case, interfaces 104 may enable a data communication with servers 610, for instance via the Internet, and GNSS receiver 622 via an internal connection; and data memory 103 may enable storage of received assistance data and associated data.

Figure 7:
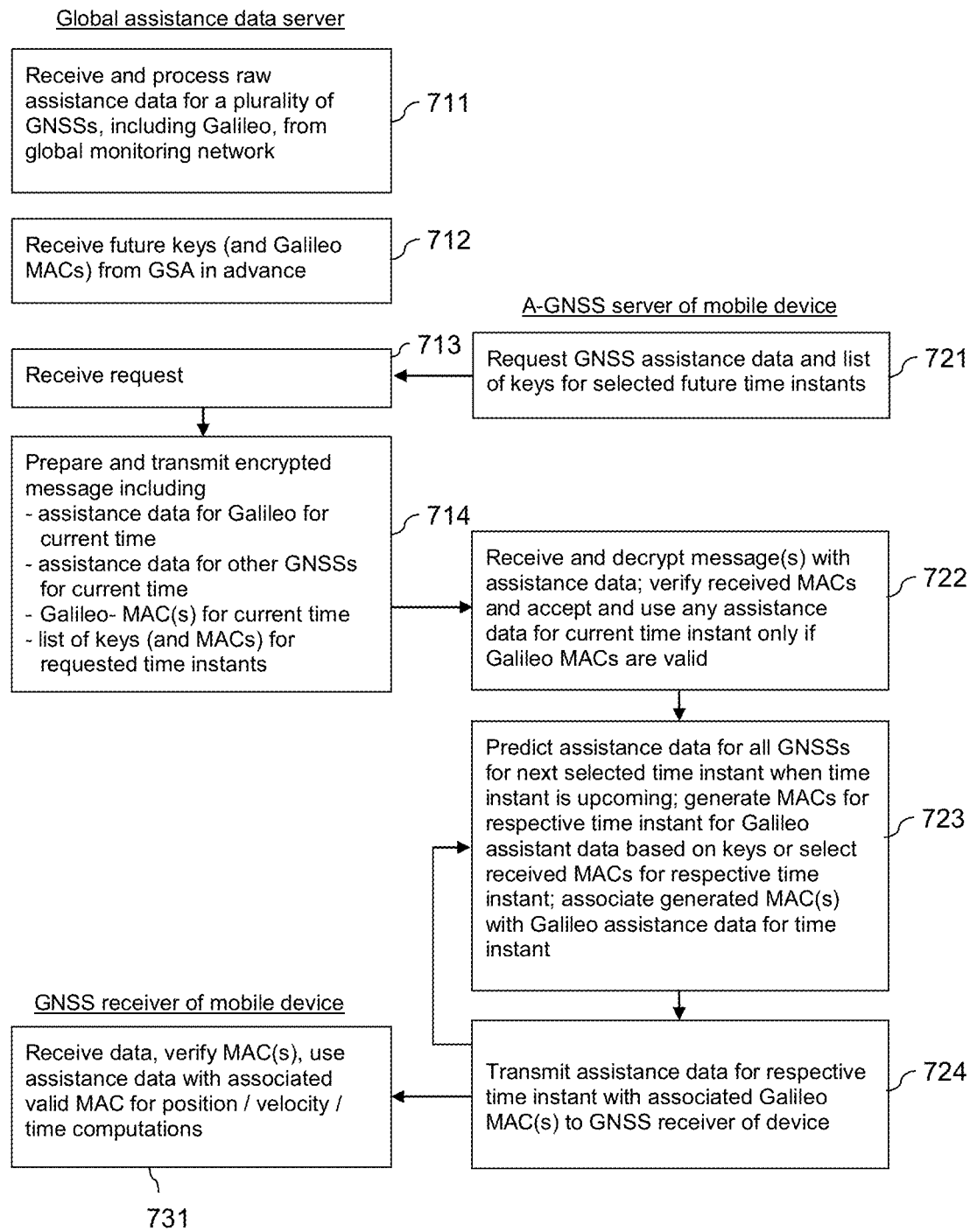
FIG. 7 is a flow chart illustrating an example embodiment of operations in the system of FIG. 6.

FIG. 7 is a flow chart illustrating example operations in the system of FIG. 6. Server 611 is caused to perform the actions presented at the upper left hand side. A-GNSS server 621 of mobile device 620 is caused to perform the actions presented on the right hand side. GNSS receiver 622 of mobile device 620 is caused to perform the actions presented on the lower left hand side.

Server 610 receives raw assistance data for a plurality of GNSS, including Galileo, from global monitoring network 600 via a secure link. (action 711) The received data may include data from different monitoring receivers of global monitoring network 600. For Galileo, the assistance data may be associated with MACs enabling an authentication of the assistance data. The reception of the data may be a continuous process, so that current assistance data is always available.

In addition, server 610 receives future keys from GSA entity 630 via a secure link on a regular basis. They may be received for instance once a day for a day two weeks ahead. (action 712) It is to be understood that current MACs and/or future MACs could be provided by GSA entity 630 as well.

At some point in time, mobile device 620 may need assistance data enabling an offline mode for a certain period of time. In this case, A-GNSS server 621 of mobile device 620 may request from server 620 assistance data for various GNSS for a current time and a list of future keys enabling a creation of MACs for Galileo assistance data for future time instants. The request includes an indication of future time instants for which keys are desired, for instance every two hours within a period of two weeks. (action 721) Instead of the length of the period, A-GNSS server 621 may also indicate for instance the number of time instants for which keys are desired. A-GNSS server 621 may be caused for instance by GNSS receiver 622 or by some application of mobile device 620 to request the data.

Server 610 receives the request for assistance data from mobile device 620. (action 713)

Thereupon, server 610 assembles GNSS assistance data for mobile device 620. The assembled assistance data includes assistance data for Galileo for a current time, which is based on received raw assistance data. The assembled assistance data includes assistance data for other GNSSs for the current time, which is based on received raw assistance data. The assembled assistance data includes MACs for the Galileo assistance data for the current time, as received from global monitoring network 600. Finally, the assembled assistance data includes a list of keys for the requested time instants, selected from the keys received in advance from GSA entity 630.

With actions 711 and 712, assistance data and keys are generally available whenever needed by some mobile device. It is to be understood though that alternatively, at least the keys may also be obtained from GSA entity 630 only when and as far as requested by a mobile device.

Server 610 encapsulates the assembled data into a single encrypted message and transmits the message as A-GNSS response to mobile device 620. (action 714) The encryption may be based for instance on a private key that is used in common by all global assistance data servers 610. The message may include further data that does not constitute actual GNSS assistance data, for instance digital signatures that have been provided by Galileo satellites 640 and forwarded by global monitoring network 600, configuration data associated with requesting mobile device 620, an IP-address of server 610, certificates, and/or other sensitive data.

Mobile device 620 receives the response. A-GNSS server 621 may store a public key corresponding to a private key used by server 610 for encrypting the encrypted A-GNSS message. A-GNSS server 621 may decrypt the message using this stored public key. A-GNSS server 621 may verify the received Galileo MACs. (action 722) If the MAC(s) received for Galileo are determined not to be valid, A-GNSS server 621 discards the assistance data received in the A-GNSS response for all GNSSs, not only for Galileo, and all associated data. If the MAC(s) received for Galileo are determined to be valid, A-GNSS server 621 considers the assistance data received in the A-GNSS response for all GNSSs to be authentic, not only the assistance data for Galileo. If the assistance data is accepted, the assistance data may be provided to GNSS receiver 622 for conventional use in position/velocity/time computations. Thus, the MACs are not only used to authenticate Galileo related data, but also the data for other GNSSs for the current time included in the same message, and optionally further associated data.

If the assistance data is accepted, A-GNSS server 621 moreover predicts assistance data for all GNSSs for the next selected time instant, when this time instant is upcoming. The prediction may include for instance a prediction of satellite orbit and clock models for all satellites 640, 650 for which assistance data has been received as key assistance data elements. A-GNSS server 621 furthermore generates MACs for the respective time instant for the predicted assistant data for all Galileo satellites. The MACs are generated based on the keys that have been received in the list of keys for the respective time instant. In addition, the generation of the MACs may take account of the satellite identifier for which the predicted assistance data is valid. The generated MACs are associated with the predicted Galileo assistance data for which they are generated. (action 723) Generating a MAC for predicated assistance data based on an available key for the relevant time instant may be the same process as generating a MAC based on an available key for validating a MAC that is associated with original navigation data from a satellite or original assistance data from server 610.

A-GNSS server 621 transmits the predicted assistance data for the respective time instant with associated Galileo MACs to GNSS receiver 622 of mobile device 620. (action 724)

GNSS receiver 622 receives the data, verifies the MACs, and uses the assistance data for position/velocity/time computations, if the associated MACs are valid. (action 731) Consequently, GNSS receiver 622 does not have to differentiate between Galileo data that is received from Galileo satellites 640, original Galileo assistance data that is provided by server 610 and Galileo assistance data predicted by internal A-GNSS server 621.

It is to be understood that in the approach presented with reference to FIG. 4 as well as in the approach presented with reference to FIG. 7, any desired additional encryption and authentication schemes not mentioned may be included for any of the indicated links and communications in order to increase the total level of security.

It is to be understood that the presented example systems, apparatuses and operations may be varied in many ways.

The systems and devices may be varied for instance by modifying, adding or omitting components. The operations may be varied for instance by modifying actions, by omitting actions and/or by adding actions. In addition, the order of actions may be modified.

For example, in a variation, GSA entity 330 of FIG. 3 or GSA entity 630 of FIG. 6 may provide the raw assistance data to global assistance data servers 310/610 rather than a global monitoring network 300/600.

For example, in a variation of the system of FIG. 6, server 610 may be omitted and A-GNSS server 621 may receive all data directly from GSA entity 630.

For example, in case GSA entity 330/630 provides a list of future MACs in addition to future keys to servers 310/610 in action 412/712, servers 310 or server 621, respectively, are not required to compute the MACs that are to be associated with the predicted Galileo assistance data.

For example, as long as the transmission of MACs by Galileo satellites has not yet been implemented, some A-GNSS service providers may use proprietary definitions of MACs. In this case, the original MACs are not received by a server of the service provider, but generated in a server of the service provider based on one or more secret seed keys. GNSS receivers of mobile devices and optionally (e.g. in the case of FIG. 6) A-GNSS servers of mobile devices may then be configured to generate MACs based on algorithms defined by the service provider and on keys provided by the service provider.

Summarized, certain embodiments may enable mobile devices to provide trusted positioning services in fully offline mode, as message authentication codes are also provided for predicted assistance data.

The following embodiments of the invention are also disclosed:

Embodiment 1

1. A method comprising, performed by at least one device:
obtaining assistance data for Galileo for a current time from at least one terrestrial apparatus;
predicting assistance data for Galileo for a plurality of subsequent time instants based on the obtained assistance data for Galileo and associating for each subsequent time instant a separate message authentication code with the predicted assistance data; and
causing transmission of information comprising at least the predicted assistance data for Galileo and the associated message authentication codes to a satellite signal receiver.

Embodiment 2

The method according to embodiment 1, wherein the message authentication codes associated with assistance data for Galileo for each subsequent time instant are one of:
obtained in a list of future message authentication codes from an entity of a trusted source; or
generated based on keys from a list of keys usable for generating future message authentication codes and obtained from an entity of a trusted source.

Embodiment 3

The method according to embodiment 1 or 2, further comprising requesting a trusted source to provide a list of at least one of:

message authentication codes for specific future time instants; and/or
keys enabling a generation of message authentication codes for specific future time instants.

Embodiment 4

The method according to any one of embodiments 1 to 3, further comprising receiving a request for assistance data for Galileo for future time instants from the satellite signal receiver, wherein causing transmission of the information comprising the predicted assistance data for Galileo and the associated message authentication codes to the satellite signal receiver comprises providing the information in a response to the request.

Embodiment 5

The method according to embodiment 4, wherein the request comprises:
an indication of a time period for the future time instants; or
an indication of a time period for the future time instants and an indication of a time interval for the future time instants; or
an indication of future time instants.

Embodiment 6

The method according to any one of embodiments 1 to 5, further comprising: obtaining assistance data for at least one further satellite navigation system from at least one terrestrial apparatus;
predicting assistance data for the plurality of subsequent time instants based on the obtained assistance data for the at least one further satellite navigation system; and
causing transmission of the predicted assistance data for the at least one further satellite navigation system in an interrelated manner along with the information comprising at least the predicted assistance data for Galileo and the associated message authentication code to the satellite signal receiver.

Embodiment 7

The method according to any one of embodiments 1 to 6, wherein the at least one device is a device comprising the satellite signal receiver.

Embodiment 8

The method according to any one of embodiments 1 to 6, wherein the at least one device comprises a server that is external to a device comprising the satellite signal receiver and that is configured to provide assistance data to a plurality of satellite signal receivers.

Embodiment 9

The method according to any one of embodiments 1 to 8, wherein the at least one terrestrial apparatus comprises:
at least one satellite signal receiver of a monitoring network collecting data transmitted by satellites of at least one satellite navigation system, the at least one satellite navigation system comprising Galileo; and/or
at least one entity of a trusted source; and/or at least one server providing an A-GNSS service at least for Galileo.

Embodiment 10

A system comprising at least one apparatus, the at least one apparatus comprising means for causing performance of the actions of the method of any one of embodiments 1 to 9.

Embodiment 11

The system according to embodiment 10, wherein the system is:
- a module for a device; or
- a computer; or
- a combination of a plurality of computers; or
- a device comprising the satellite signal receiver.

Embodiment 12

A system comprising at least one processor and at least one memory, wherein the at least one memory includes computer program code, the at least one memory and the computer program code configured to, with the at least one processor, cause at least one device at least to:
- obtain assistance data for Galileo for a current time from at least one terrestrial apparatus;
- predict assistance data for Galileo for a plurality of subsequent time instants based on the obtained assistance data for Galileo and associate for each subsequent time instant a separate message authentication code with the predicted assistance data; and
- cause transmission of information comprising at least the predicted assistance data for Galileo and the associated message authentication codes to a satellite signal receiver.

Embodiment 13

The system according to embodiment 10, wherein the message authentication codes associated with assistance data for Galileo for each subsequent time instant are one of:
- obtained in a list of future message authentication codes from an entity of a trusted source; or
- generated based on keys from a list of keys usable for generating future message authentication codes and obtained from an entity of a trusted source.

Embodiment 14

The system according to embodiment 10 or 11, wherein the at least one memory and the computer program code are configured to, with the at least one processor, cause the at least one device to request a trusted source to provide a list of at least one of:
- message authentication codes for specific future time instants; and/or
- keys enabling a generation of message authentication codes for specific future time instants.

Embodiment 15

The system according to any one of embodiments 10 to 12, wherein the at least one memory and the computer program code are configured to, with the at least one processor, cause the at least one device to receive a request for assistance data for Galileo for future time instants from the satellite signal receiver, wherein causing transmission of the information comprising the predicted assistance data for Galileo and the associated message authentication codes to the satellite signal receiver comprises providing the information in a response to the request.

Embodiment 16

The system according to embodiment 15, wherein the request comprises:
- an indication of a time period for the future time instants; or
- an indication of a time period for the future time instants and an indication of a time interval for the future time instants; or
- an indication of future time instants.

Embodiment 17

The system according to any one of embodiments 10 to 16, wherein the at least one memory and the computer program code are configured to, with the at least one processor, cause the at least one device to:
- obtain assistance data for at least one further satellite navigation system from at least one terrestrial apparatus;
- predict assistance data for the plurality of subsequent time instants based on the obtained assistance data for the at least one further satellite navigation system; and
- cause transmission of the predicted assistance data for the at least one further satellite navigation system in an interrelated manner along with the information comprising at least the predicted assistance data for Galileo and the associated message authentication code to the satellite signal receiver.

Embodiment 18

The system according to any one of embodiments 10 to 17, wherein the at least one device is a device comprising the satellite signal receiver.

Embodiment 19

The system according to any one of embodiments 10 to 17, wherein the at least one device comprises a server that is external to a device comprising the satellite signal receiver and that is configured to provide assistance data to a plurality of satellite signal receivers.

Embodiment 20

The system according to any one of embodiments 10 to 19, wherein the at least one terrestrial apparatus comprises:
- at least one satellite signal receiver of a monitoring network collecting data transmitted by satellites of at least one satellite navigation system, the at least one satellite navigation system comprising Galileo; and/or
- at least one entity of a trusted source; and/or
- at least one server providing an A-GNSS service at least for Galileo.

Embodiment 21

The system according to any of embodiments 10 to 20, wherein the system is:
- a module for a device; or a computer; or a combination of a plurality of computers; or a device comprising the satellite signal receiver.

Embodiment 22

A computer program code, which is configured to causes at least one device to perform the actions of the methods of any one of embodiments 1 to 9 when executed by at least one processor.

Embodiment 23

A computer readable storage medium in which computer program code is stored, the computer program code causing at least one device to perform the following when executed by at least one processor:

obtain assistance data for Galileo for a current time from at least one terrestrial apparatus;

predict assistance data for Galileo for a plurality of subsequent time instants based on the obtained assistance data for Galileo and associate for each subsequent time instant a separate message authentication code with the predicted assistance data; and cause transmission of information comprising at least the predicted assistance data for Galileo and the associated message authentication codes to a satellite signal receiver.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor 101 in combination with memory 102 can also be viewed as means for obtaining assistance data for Galileo for a current time from at least one terrestrial apparatus; means for predicting assistance data for Galileo for a plurality of subsequent time instants based on the obtained assistance data for Galileo and associating for each subsequent time instant a separate message authentication code with the predicted assistance data; and means for causing transmission of information comprising at least the predicted assistance data for Galileo and the associated message authentication codes to a satellite signal receiver.

The program code in memory 102 can also be viewed as comprising such means in the form of functional modules.

FIGS. 2, 4 and 7 may also be understood to represent example functional blocks of computer program codes supporting an extended use of assistance data for Galileo.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method, performed by at least one device, comprising:

obtaining assistance data for a global navigation satellite system for a current time from at least one terrestrial apparatus;

predicting assistance data for the global navigation satellite system for a plurality of future time instants based on the obtained assistance data for the global navigation satellite system;

associating, respectively for each future time instant, a separate future message authentication code with the predicted assistance data; and before the future time instants, causing transmission of information comprising at least the predicted assistance data for the global navigation satellite system and the associated message authentication codes to a satellite signal receiver.

2. The method according to claim 1, wherein the message authentication codes associated with assistance data for the global navigation satellite system for each future time instant are one of:
   obtained in a list of future message authentication codes from an entity of a trusted source; or
   generated based on keys from a list of keys usable for generating future message authentication codes and obtained from an entity of a trusted source.

3. The method according to claim 1, further comprising:
   requesting a trusted source to provide a list of at least one of:
      message authentication codes for specific future time instants; and/or
      keys enabling a generation of message authentication codes for specific future time instants.

4. The method according to claim 1, further comprising:
   receiving a request for assistance data for the global navigation satellite system for future time instants from the satellite signal receiver, wherein causing transmission of the information comprising the predicted assistance data for the global navigation satellite system and the associated message authentication codes to the satellite signal receiver comprises providing the information in a response to the request.

5. The method according to claim 4, wherein the request comprises:
   an indication of a time period for the future time instants; or
   an indication of a time period for the future time instants and an indication of a time interval for the future time instants; or
   an indication of future time instants.

6. The method according to claim 1, further comprising:
   obtaining assistance data for at least one further satellite navigation system from at least one terrestrial apparatus;
   predicting assistance data for the plurality of future time instants based on the obtained assistance data for the at least one further satellite navigation system; and
   causing transmission of the predicted assistance data for the at least one further satellite navigation system in an interrelated manner along with the information comprising at least the predicted assistance data for the global navigation satellite system and the associated message authentication code to the satellite signal receiver.

7. The method according to claim 1, wherein the at least one device is a device comprising the satellite signal receiver.

8. The method according to claim 1, wherein the at least one device comprises a server that is external to a device comprising the satellite signal receiver and that is configured to provide assistance data to a plurality of satellite signal receivers.

9. The method according to claim 1, wherein the at least one terrestrial apparatus comprises:
   at least one satellite signal receiver of a monitoring network collecting data transmitted by satellites of the global satellite system comprising Galileo; and/or
   at least one entity of a trusted source; and/or
   at least one server providing an A-GNSS service at least for Galileo.

10. A system comprising at least one processor and at least one memory, wherein the at least one memory includes computer program code, the at least one memory and the computer program code configured to, with the at least one processor, cause at least one device at least to:
   obtain assistance data for a global navigation satellite system for a current time from at least one terrestrial apparatus;
   predict assistance data for the global navigation satellite system for a plurality of subsequent time instants based on the obtained assistance data for the global navigation satellite system;
   associate, for each subsequent time instant, a separate future message authentication code with the predicted assistance data; and
   before the plurality of subsequent time instants, cause transmission of information comprising at least the predicted assistance data for the global navigation satellite system and the associated message authentication codes to a satellite signal receiver.

11. The system according to claim 10, wherein the message authentication codes associated with assistance data for the global navigation satellite system for each subsequent time instant are one of:
   obtained in a list of future message authentication codes from an entity of a trusted source; or
   generated based on keys from a list of keys usable for generating future message authentication codes and obtained from an entity of a trusted source.

12. The system according to claim 10, wherein the at least one memory and the computer program code are configured to, with the at least one processor, cause the at least one device to request a trusted source to provide a list of at least one of:
   message authentication codes for specific future time instants; and/or
   keys enabling a generation of message authentication codes for specific future time instants.

13. The system according to claim 10, wherein the at least one memory and the computer program code are configured to, with the at least one processor, cause the at least one device to receive a request for assistance data for the global navigation satellite system for future time instants from the satellite signal receiver, wherein causing transmission of the information comprising the predicted assistance data for the global navigation satellite system and the associated message authentication codes to the satellite signal receiver comprises providing the information in a response to the request.

14. The system according to claim 13, wherein the request comprises:
   an indication of a time period for the future time instants; or
   an indication of a time period for the future time instants and an indication of a time interval for the future time instants; or
   an indication of future time instants.

15. The system according to claim 10, wherein the at least one memory and the computer program code are configured to, with the at least one processor, cause the at least one device to:
   obtain assistance data for at least one further satellite navigation system from at least one terrestrial apparatus;
   predict assistance data for the plurality of subsequent time instants based on the obtained assistance data for the at least one further satellite navigation system; and cause transmission of the predicted assistance data for the at least one further satellite navigation system in an interrelated manner along with the information comprising at least the predicted assistance data for the global navigation satellite system and the associated message authentication code to the satellite signal receiver.

16. The system according to claim 10, wherein the at least one device is a device comprising the satellite signal receiver.

17. The system according to claim 10, wherein the at least one device comprises a server that is external to a device comprising the satellite signal receiver and that is configured to provide assistance data to a plurality of satellite signal receivers.

18. The system according to claim 10, wherein the at least one terrestrial apparatus comprises:
   at least one satellite signal receiver of a monitoring network collecting data transmitted by the global navigation satellite system including Galileo; and/or
   at least one entity of a trusted source; and/or
   at least one server providing an A-GNSS service at least for Galileo.

19. The system according to claim 10, wherein the system is:
   a module for a device; or
   a computer; or
   a combination of a plurality of computers; or
   a device comprising the satellite signal receiver.

20. A non-transitory computer readable storage medium in which computer program code is stored, the computer program code causing at least one device to perform the following when executed by at least one processor: obtain assistance data for a global navigation satellite system for a current time from at least one terrestrial apparatus; predict assistance data for the global navigation satellite system for a plurality of subsequent time instants, respectively, based on the obtained assistance data for the global navigation satellite system; associate, for each subsequent time instant, a separate future message authentication code with the predicted assistance data; and before the plurality of subsequent time instants, cause transmission of information comprising at least the predicted assistance data for the global navigation satellite system and the associated message authentication codes to a satellite signal receiver.

* * * * *